(12) United States Patent
Jackman et al.

(10) Patent No.: US 7,584,974 B2
(45) Date of Patent: Sep. 8, 2009

(54) FOLDING MEANS AND FOLDING APPARATUS USING THE SAME

(75) Inventors: Thomas Richard Jackman, Palmerston North (NZ); Jayson Leslie Puklowski, Palmerston North (NZ)

(73) Assignee: Flexibility Concepts Ltd, Palmerston North (NZ)

( * ) Notice: Subject to any disclaimer, the term of this patent is extended or adjusted under 35 U.S.C. 154(b) by 0 days.

(21) Appl. No.: 11/924,467

(22) Filed: Oct. 25, 2007

(65) Prior Publication Data

US 2008/0315544 A1 Dec. 25, 2008

(30) Foreign Application Priority Data

Jun. 21, 2007 (NZ) ....................................... 556020

(51) Int. Cl.
*A63C 17/00* (2006.01)

(52) U.S. Cl. ............................... 280/87.05; 280/87.041; 280/87.021; 280/14.28; 280/87.3; 180/219; 180/220; 180/65.1; 180/65.3; 180/181

(58) Field of Classification Search .............. 280/87.05, 280/87.041, 87.021, 14.28, 87.3; 180/219, 180/220, 65.1, 65.3, 181, 180
See application file for complete search history.

(56) References Cited

U.S. PATENT DOCUMENTS

| 1,227,888 | A | * | 5/1917 | Converse | ............... | 280/87.041 |
|---|---|---|---|---|---|---|
| 6,206,387 | B1 | * | 3/2001 | Tsai | ....................... | 280/87.041 |
| 6,234,501 | B1 | * | 5/2001 | Chen | ...................... | 280/87.041 |
| 6,260,866 | B1 | * | 7/2001 | Cheng | ..................... | 280/87.05 |
| 6,270,097 | B1 | * | 8/2001 | Lin | .......................... | 280/87.05 |
| 6,276,701 | B1 | * | 8/2001 | Chen | ....................... | 280/87.05 |
| 6,283,485 | B1 | * | 9/2001 | Tsai | ......................... | 280/87.05 |
| 6,443,470 | B1 | * | 9/2002 | Ulrich et al. | ........... | 280/87.041 |
| 6,866,275 | B1 | * | 3/2005 | Puzey | ...................... | 280/87.05 |
| 7,156,405 | B1 |   | 1/2007 | Ming | ...................... | 280/87.05 |
| 2003/0001351 | A1 |   | 1/2003 | Schauble et al. | ......... | 280/87.05 |
| 2005/0248111 | A1 |   | 11/2005 | Lu | ......................... | 280/87.041 |

FOREIGN PATENT DOCUMENTS

| DE | 298 07616 | 8/1998 |
|---|---|---|
| DE | 100 25 923 | 11/2001 |

* cited by examiner

*Primary Examiner*—Jeffrey J Restifo
*Assistant Examiner*—Cynthia F Collado
(74) *Attorney, Agent, or Firm*—Baldwins Intellectual Property

(57) ABSTRACT

A folding means for a foldable apparatus, the folding means comprising a first member (2) having a locking end (4) and a second member (5) having an opening (16) through which the locking end (4) of the first member (2) is located, the locking end (4) being pivotally attached to the second member (5) via a pivot means and the locking end (4) comprising at least one catch (26), and wherein a locking means that is adapted to engage with the catch (26) and the second member (5) to lock the apparatus in a particular position.

14 Claims, 8 Drawing Sheets

FOLDING MEANS AND FOLDING APPARATUS USING THE SAME

RELATED APPLICATION

This application claims the benefit of New Zealand Provisional Application No. 556020, filed 21 Jun. 2007, the contents of which are incorporated by reference herein in their entirety.

FIELD OF INVENTION

The present invention relates to a folding means for foldable apparatus, the folding means having a locking means for holding the apparatus in a folded or unfolded position. Whilst specifically described with reference to a scooter, at least some of the features described herein will have application in other types of foldable apparatus, for example, pallet trolleys, or prams.

BACKGROUND OF THE INVENTION

In the field of folding means and, in particular, the field of folding means for scooters, various proposals have been put forward for ease of use in relation to packaging and stowage. Consequently, it is known in the art for scooters to comprise folding means to allow the scooter to be folded into a compact form for easy stowage, packaging, and transportation when not in use. In many situations there is a need for a scooter to be packaged and stowed compactly without sacrificing rigidity and safety.

In known examples, a scooter can have a folding means incorporating components located on the steering column and the steering column bracket that connects the steering column to the scooter deck. Very often, the components are in a difficult position to reach and a user may need to operate more than one lever to fold the scooter.

The assembly and disassembly of such designs can be difficult and time consuming, particularly for a child. Additionally, a user's feet or clothing can easily catch in the parts which can be a safety risk, especially as children are the main users of scooters.

It is an object of the present invention to provide a folding means for a folding apparatus that goes at last some way towards overcoming the above-mentioned disadvantages, or to at least provide the public with a useful choice.

As already mentioned, the folding means of the invention is suitable for scooters, pallet trolleys and other folding trolleys for material handling, for example in the agricultural and horticultural fields, prams, children's ride-on toys, transporters and the like. For simplicity, the present invention will be hereinafter described in respect of a folding means for a scooter but it is to be understood that a folding means for any other type of mobile apparatus is envisaged to be within the applications to which the present application could be put and the term "mobile apparatus" is to be understood to have that broad meaning.

It will also be appreciated by those skilled in the engineering arts that the present invention could also be used in various other situations and wherever a folding of a multi-part item is required.

SUMMARY OF THE INVENTION

According to one aspect of the present invention there is provided a folding means for a foldable apparatus, the folding means comprising a first member having a locking end and a second member having an opening through which the locking end of the first member is located, the locking end being pivotally attached to the second member via a pivot means and the locking end comprising at least one catch, and wherein a locking means that is adapted to engage with the catch and the second member to lock the apparatus in a particular position.

Preferably, the locking end has opposing side surfaces with a semi-circular peripheral edge.

Preferably, the pivot means is attached to the second member, the pivot means engaging with pivot engagement means located on the locking end of the first member, such that the pivot means attaching the first member to the second member in a pivotable arrangement. Preferably, the pivot means is an axle that extends through opposing apertures located in the side surfaces of the locking end of the first member.

Preferably, the locking end has at least one catch positioned on the peripheral edge of the locking end. Alternatively, the locking end has at least one catch positioned on at least one side surface of the locking end. More preferably, the locking end has a pair of catches that are located on the locking end in particular positions so that the locking means can engage with a catch when the apparatus is in either a folded or unfolded position.

Preferably, the catch is in the form of a channel positioned in the peripheral edge of the locking end. Alternatively, the catch is an aperture in at least one side surface of the locking end. In another form, the catch may be a recess positioned in at least one surface of the locking end.

Preferably, the foldable apparatus is a scooter.

Preferably, the first member is a supporting bracket for a scooter steering assembly and the second member is a scooter deck.

Preferably, the locking means is located substantially beneath the scooter deck.

Preferably, the locking means is dimensioned such that it does not protrude beyond the longitudinal width of the side wall of the scooter.

Preferably, the locking means can be released by hand or by foot.

In another aspect, the present invention provides a foldable apparatus comprising a folding means according to the invention.

The term "comprising" as used in this specification and claims should be interpreted to mean "consisting at least in part of" or "comprising". That is, when interpreting independent claims comprising that term, the features prefaced by that term in each claim all need to be present but other features can also be present. Variants, such as "comprised" and "comprises" are to be interpreted in the same manner.

The invention may also be said to broadly consist in the parts, elements and features referred to or indicated herein, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Further aspects of the invention which should be considered in all its novel aspects will become apparent from the following description given by way of example of possible embodiments thereof and in which reference is made to the accompanying drawings wherein.

DETAILED DESCRIPTION OF THE INVENTION

In broad terms, the invention provides a first member having a locking end and a second member having an opening therein. The locking end of the first member is positioned within the opening of the second member. The locking end comprises a pair of opposing sides and has a pivot engagement means in the form of an aperture, recess or detent in at least one side. Preferably, an aperture, detent, or recess is located on each side of the locking end in opposing relationship to each other.

An axle, spindle, or similar pivot means is attached to, or integral with, the second member. The axle is in alignment with the aperture(s) or detent(s) provided in the locking end of the first member so that the locking end is pivotally attached to the second member by the axle engaging with the aperture(s) or detent(s) in the first member.

Preferably, the locking end of the first member has opposing side surfaces with a circular or semi-circular peripheral edge. It is envisaged that the side surfaces will usually be planar. However, the side surfaces may also be convex or concave. The locking end may include at least one catch in the peripheral edge. Alternatively, the at least one catch may be located on one or both side surfaces of the locking end. The catch may be in the form or an aperture, recess, detent or the like. The catch is adapted to engage with a locking means attached to, or integral with the second member. The locking means serves to lock the first member to the second member in a particular position.

Figure 1:
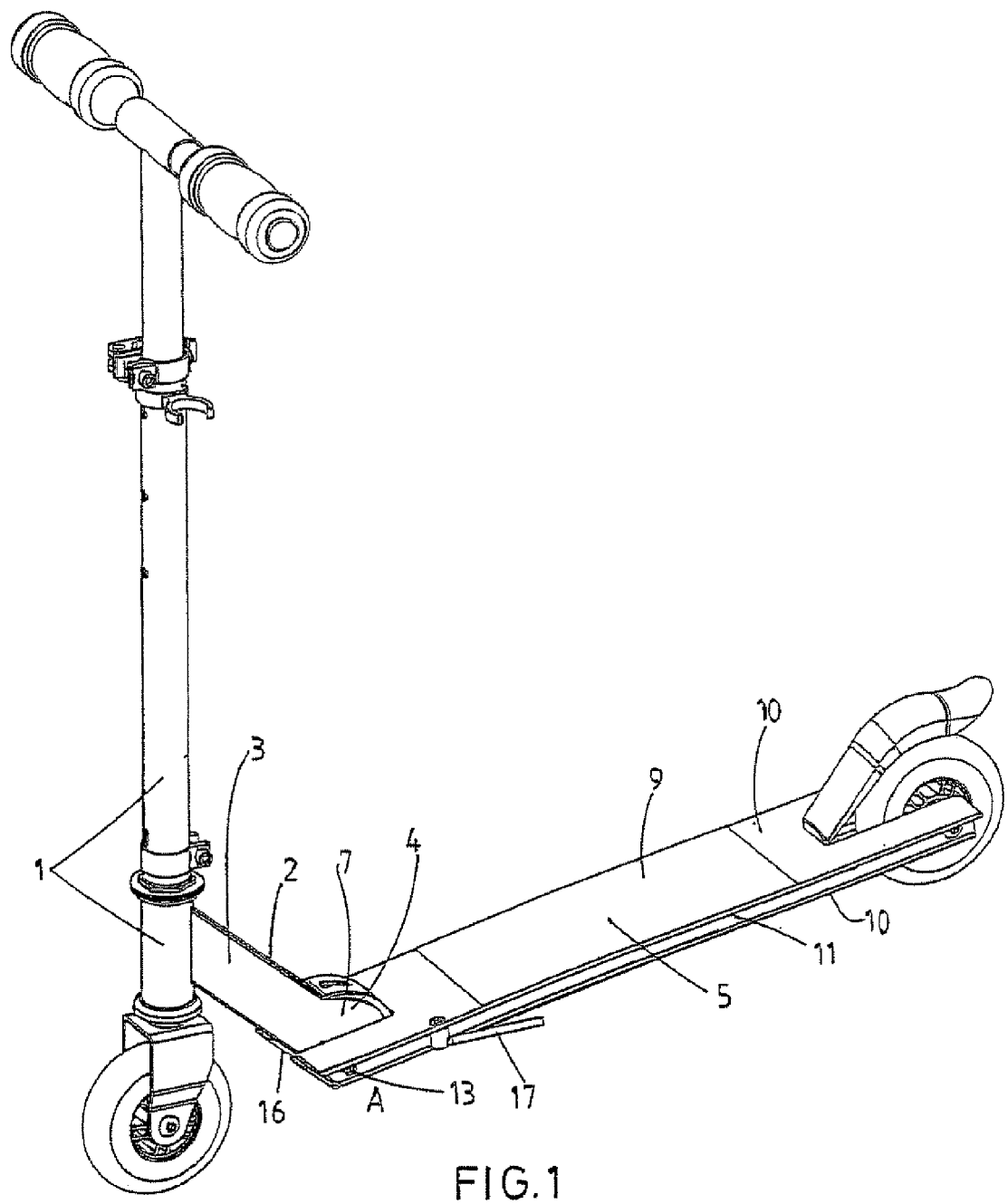
FIG. 1 is a perspective view of a scooter in the operational position according to one embodiment of the invention.
Figure 2:
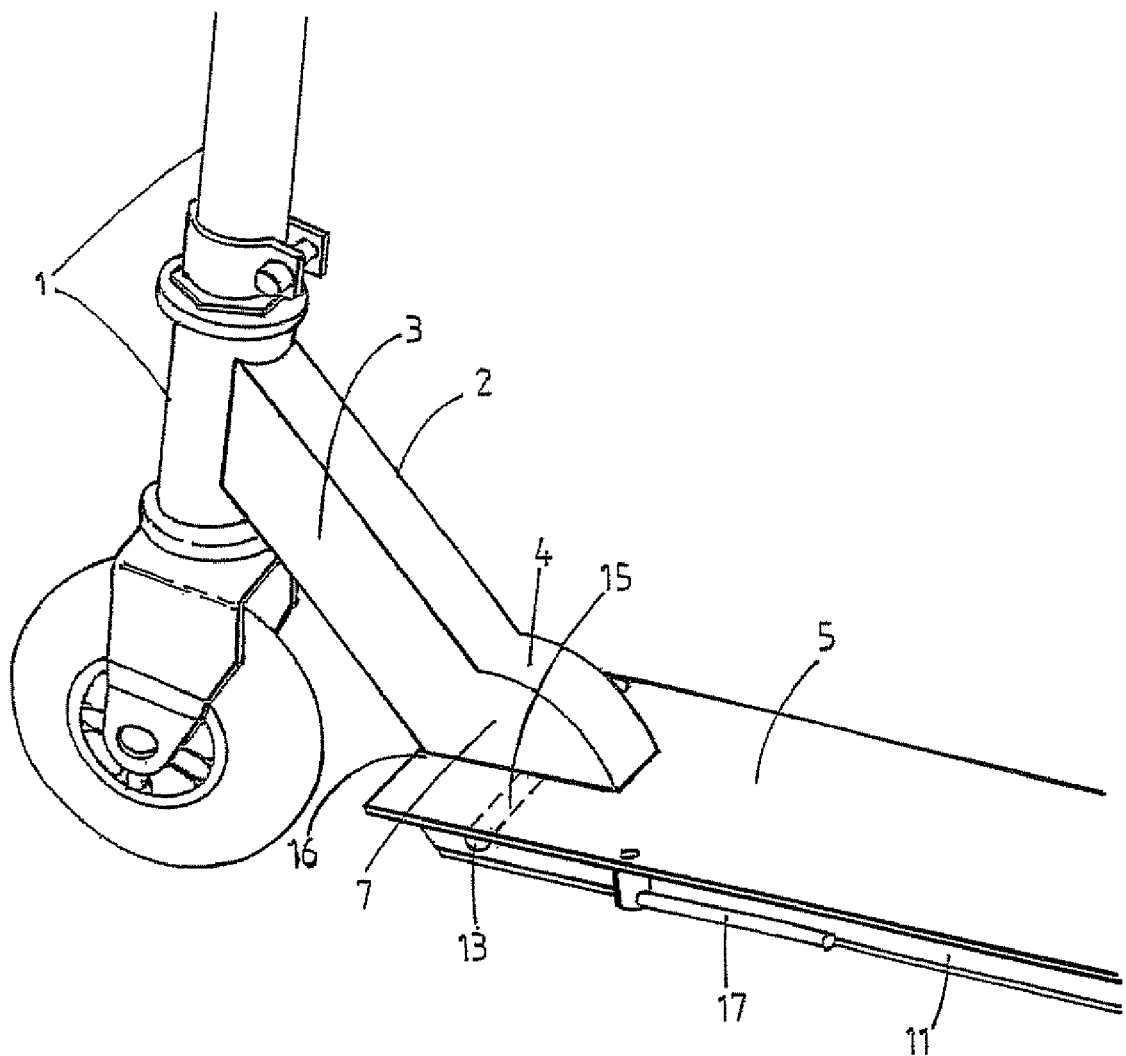
FIG. 2 is a perspective view from one side of a scooter according to one embodiment of the invention.

The folding and locking means according to one embodiment of the invention and shown in relation to a scooter can be seen at FIGS. 1 and 2. The scooter includes a steering column assembly (1), which is fixed to a supporting bracket (2). The bracket (2) includes a supporting end (3) that is attached to, or integral with, the steering column assembly (1). The bracket (2) also includes a pivotable locking end (4) that is attached to the scooter deck (5) at a pivot point in such a way that the bracket (2) is able to pivot about the pivot point. In a preferred form, the locking end (4) is substantially circular or semi-circular. However, it is envisaged that the locking end (4) may also be of other shapes, such as triangular or rectangular.

The locking end (4) has a pair of substantially opposing planar side faces (7), each having an axle-receiving aperture or detent (not shown). The axle-receiving apertures or detents comprise the pivot point for the locking end (4) of the bracket (2).

The scooter deck (5) includes a planar upper portion (9) on which a user stands. The upper portion (9) is strengthened and supported by a pair of side walls (11) or a base (10) comprising a pair of side walls (11), attached to, or integral with, the upper portion (9). The side walls (11) have axle receiving apertures (13, 14) near the forward end of the deck (5) through which an axle (15) can be located.

The scooter deck (5) also comprises an opening (16) in the form of a slot at the forward end of the deck (5). The opening (16) is wide enough to receive the locking end (4) of the supporting bracket (2).

The axle-receiving apertures (13,14) of the base (10) of the deck (5) should align with the axle-receiving apertures (50) or detents of the locking end (4) of the bracket (2) when the bracket (2) is positioned within the deck opening (16).

An axle (15) is located through the axle-receiving apertures (13,14) in both the base of the deck (10) and the locking end (4) of the bracket (2) to pivotably attach the bracket (2) to the scooter deck (5). The axle (15) may be in the form of a bolt with a threaded end. In this form, a nut is threaded onto the threaded end of the bolt after the bolt is inserted through the axle-receiving apertures in the deck base (10) and the supporting bracket (2). The axle (15) forms a pivot point about which the supporting bracket (2) can pivot about the scooter deck (5) so that the scooter can be positioned in either an operational position or a folded position.

It is envisaged that the axle arrangement may take other forms without departing from the scope of the invention, such forms being readily apparent to a person skilled in the art. For example, the base of the scooter deck may comprise a pair of inwardly protruding retractable axle arms near the forward end of the deck. The axle arms would be biased to a fully extended position but could be pushed back to a semi or fully retractable position with force or mechanical means. The axle arms would be aligned with the axle-receiving apertures or detents in the locking end of the steering column bracket. When the bracket is positioned in the forward opening of the scooter deck, the axle arms would be partly or fully retracted to allow the bracket to be properly positioned within the opening without hindrance. Once the bracket is correctly positioned, the axle arms can be fully extended to extend through axle-receiving apertures on the locking end of the bracket, or to engage with axle-receiving detents on the locking end, thus pivotably attaching the steering column bracket to the scooter deck. It is envisaged that the steering column bracket could also be pivotably attached to the deck at just one side of the bracket.

The circular or semi-circular locking end (4) of the supporting bracket (2) allows the bracket (2) to pivot easily within the forward opening (16) of the scooter deck (5), whilst not resulting in a gap between the bracket (2) and the edges of the deck opening (16) that would result if the locking end (4) of the supporting bracket (2) was substantially rectangular, for example. Such a gap between the bracket (2) and the edges of the deck opening (16) is undesirable because a user's foot or clothing could get caught in the gap and risk injury to the user.

An advantage of having the pivot point positioned below the scooter deck (5) is that there is no folding means on the top side of the scooter deck (5) or on the supporting bracket (2)

that can interfere with the scooter's operation or that can cause a user's fingers or clothing to become caught or jammed in the folding means while the scooter is in use. This makes the folding arrangement safer to use than other known scooters.

Although the folding means has been described in relation to a scooter, it is envisaged that the mechanism may also be used in other foldable apparatus, such as a pallet trolley, pram, or the like.

The scooter or foldable apparatus may comprise various forms of locking means to lock the apparatus in an operational position or in a folded position.

Figure 3:
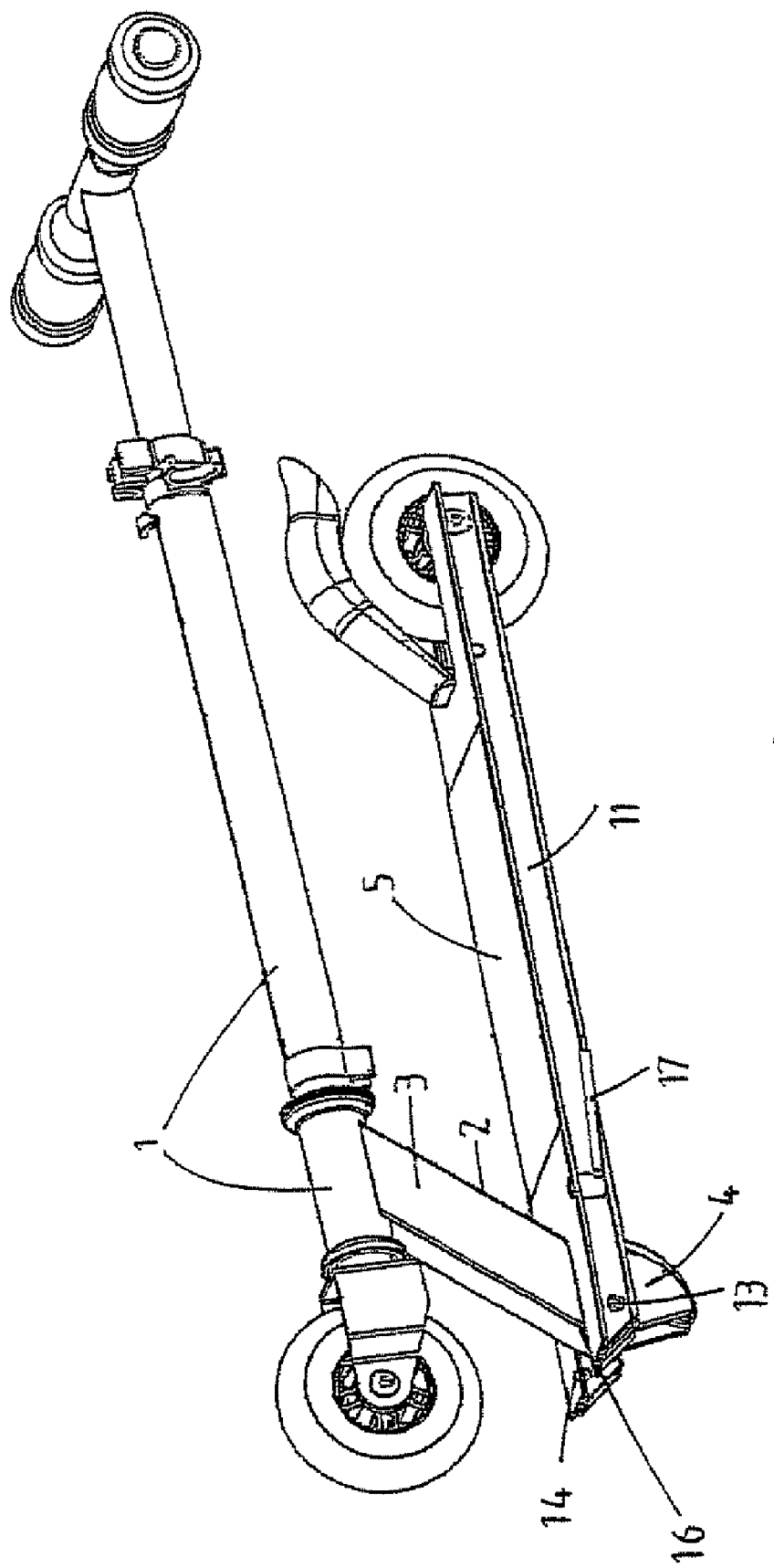
FIG. 3 is a perspective view from one side of a scooter in the folded position according to one embodiment of the invention.

FIG. 3 shows the scooter in a folded position, part of the locking end (4) of the supporting bracket (2) being visible below the scooter deck (5). A lever (17) is also shown and will be described in more detail below.

Figure 4:
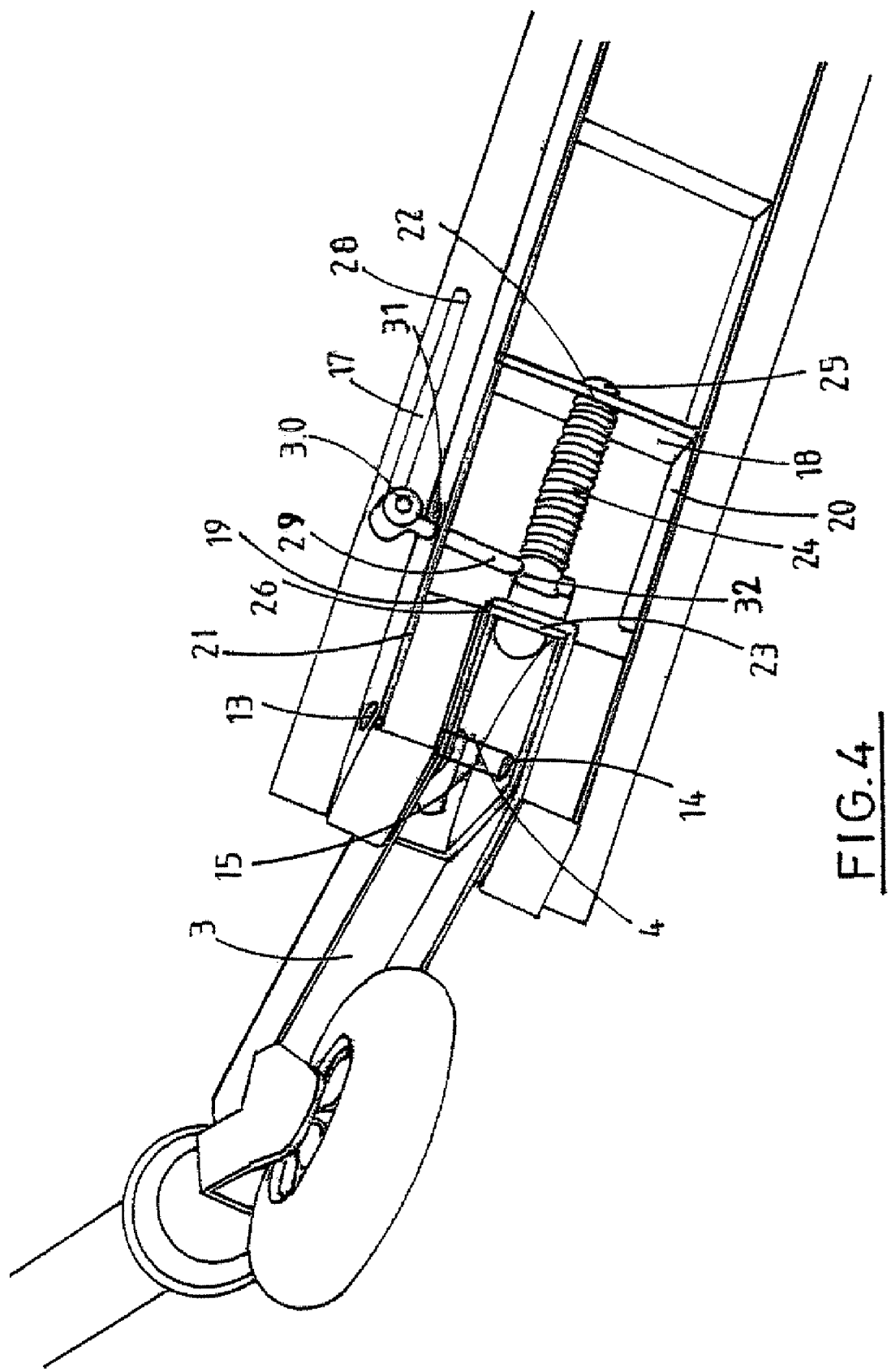
FIG. 4 is a perspective view from below showing one form of locking means that may be used with a scooter (shown in an operational position) according to one embodiment of the invention.
Figure 5:
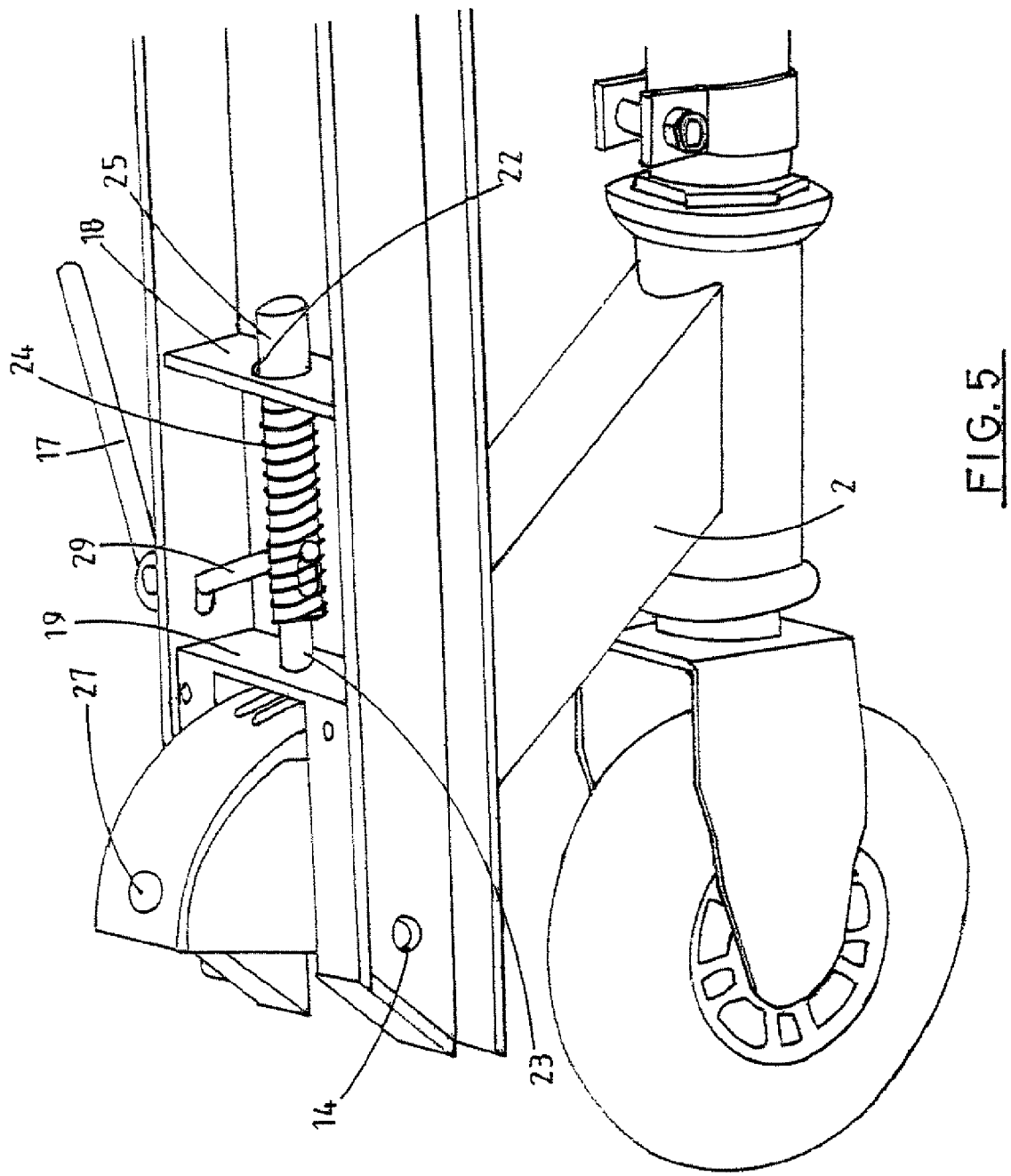
FIG. 5 is another perspective view from below showing the locking means of FIG. 4 when the scooter is in a folded position.

Turning now to the underside of one embodiment of scooter as shown in FIGS. 4 and 5, a locking means is shown. FIG. 4 shows the locking means of the scooter when the scooter is in its operational position and FIG. 5 shows the locking means of the scooter in a retracted and folded position.

The locking means may be situated at the front of and below the upper surface of the scooter deck (5).

The locking means may be supported at a first end by a first cross-member (18) and at a second end by a second cross-member (19). The cross-members (18 and 19) can be welded to inner side walls (20, 21) beneath the scooter deck (5) or joined by any other suitable means. Each cross-member (18 and 19) has a central aperture (22 and 23) through which moveable locking means is fitted. The locking means may be in the form of a springed bolt (24) which may be made of any suitable material such as metal or a strong polymer.

The first end of the springed bolt (24) may extend through the aperture of the first cross-member (18) and may be secured to the first cross-member (18) by any suitable means, such as a tension nut and washer arrangement (25).

The second end of the springed bolt (24) may extend through the aperture (23) of the second cross-member (19) and engage with a first catch (26) in the locking end (4) of the supporting bracket (2). The locking end (4) comprises a first catch (26) and a second catch (27) in its peripheral circumferential surface. Each catch (26, 27) may be in the form of an aperture, detent, recess, or the like. Each catch (26, 27) is positioned to align with the locking means when the scooter is in either the operational position or in the folded position. When the locking means is engaged with a catch (26, 27) of the locking end (4) of the supporting bracket (2), the supporting bracket (2) and the scooter deck (5) are locked in position.

When the locking means is in the form of a springed bolt (24), or similar biasing means, the locking means is biased to the locking position.

A lever arrangement (17) is in operable engagement with the springed bolt (24) and may be directly attached to, or integral with, the springed bolt (24). The lever arrangement (17) includes an operating arm (28) positioned adjacent an exterior side wall (11) below the scooter deck (5). This has been found to be a convenient position for the operating arm (28), but it is envisaged that it could also be positioned in another convenient position beneath the scooter deck (5).

The lever arrangement (17) also includes an activating arm (29) and a pivot (30). The operating arm (28) is in operable engagement with the activating arm (29) via the pivot (30).

In FIGS. 1 to 5, the lever (17) is shown as a substantially "L" shape but any other suitable lever arrangement is envisaged to be within the scope of the invention. The activating arm (29) extends through an aperture (31) in a side wall (11) of the scooter deck (5) and is attached to, or in engagement with, the springed bolt (24), preferably through an aperture (32) in the springed bolt (24) in a position adjacent the second cross-member (19).

The locking means may, as shown, be arranged so that the mechanism is essentially flush with the bottom of the scooter deck (5) so that the components do not extend substantially below the longitudinal side edge (11) of the scooter deck (5) so as to interfere with the operation of the scooter in use. By arranging the locking means so that it does not interfere with the operation of the scooter, the risk of damage to the locking means is reduced.

When the scooter is required to be folded for storage and the like, the operating arm (28) or lever (17) is pulled by a user. This action allows the activating arm (29) to pivot about the pivot (30) and drive the springed bolt (24) back towards the first cross-member (18). The second end of the springed bolt (24) retracts and disengages from the catch (27) in the locking end of the supporting bracket (2). Once the springed bolt (24) has disengaged with the locking end (4) of the bracket (2), the user is able to pivot the locking end (4), relative to the scooter deck (5), to the folded position where the steering column assembly (1) is substantially parallel to the deck (5). Once the scooter deck (5) is in this folded position, the springed bolt (24) can, by release of the lever (17), slot and lock into a second catch (26) to lock the scooter in that position.

To unfold the scooter, the above steps are reversed.

Figure 6:
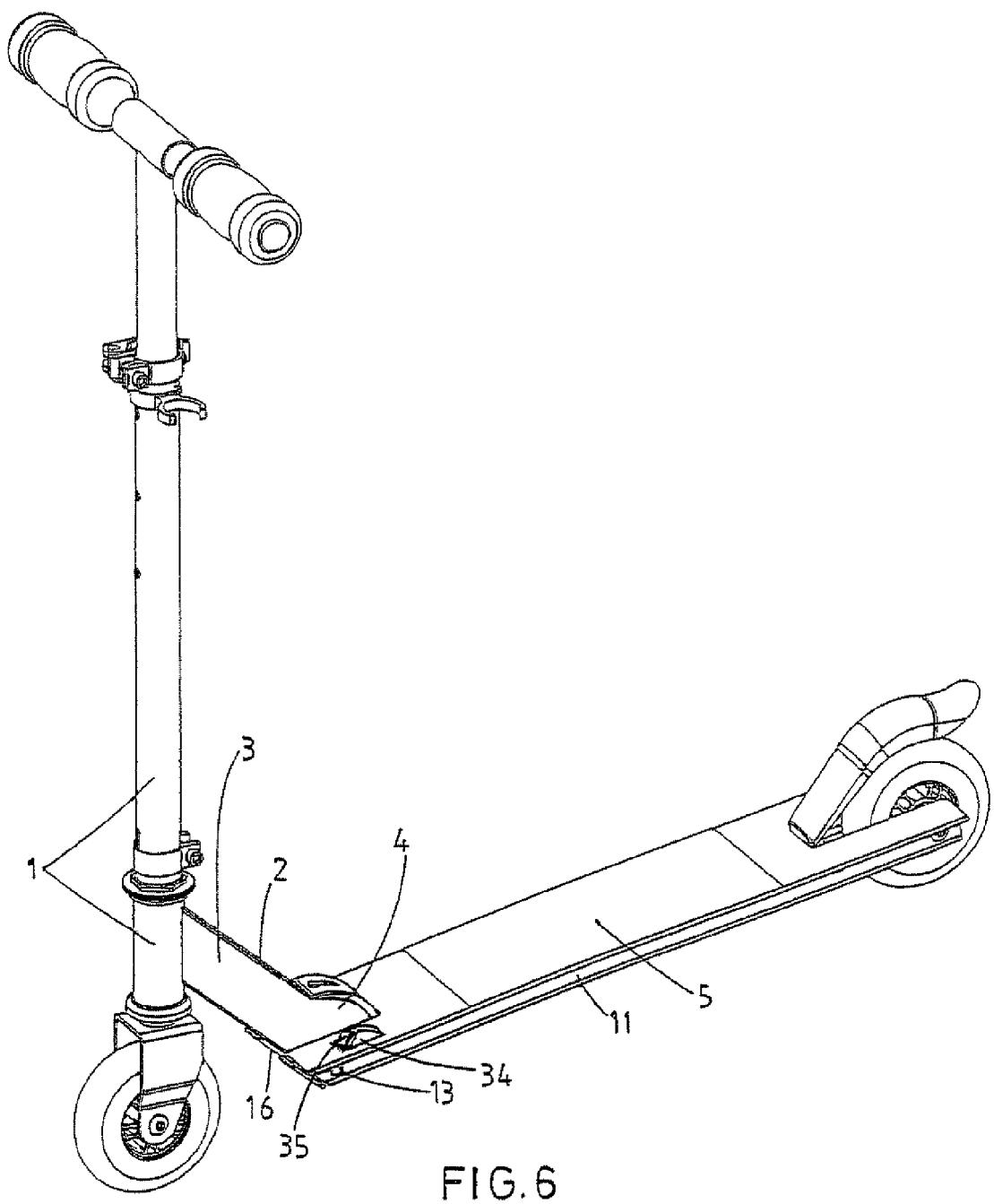
FIG. 6 is a perspective view of a scooter according to one embodiment of the invention, the scooter comprising an alternative locking means.

FIG. 6 shows a partial view of a scooter according to the invention using another form of locking means according to the invention.

In broad terms, the locking means comprises a lock release lever fixedly mounted to, or integral with, one end of an axle. The other end of the axle is, in turn, fixedly mounted to, or integral with, a support member that projects perpendicularly from the axle. A locking means is attached to, or integral with, the support member and projects from the support member such that the locking means is engageable with the locking end of the supporting bracket, as will be later described herein. The arrangement of the axle, supporting member, and locking means comprises a 'locking arm' and is referred to as such herein.

In this form of locking means, rotation of the lever about the longitudinal axis of the axle causes the axle to rotate, resulting in rotation of the support member and causing disengagement of the locking means from the locking end of the bracket.

Preferably, the locking means projects perpendicularly from the support member in the longitudinal direction of the axle.

Figure 7:
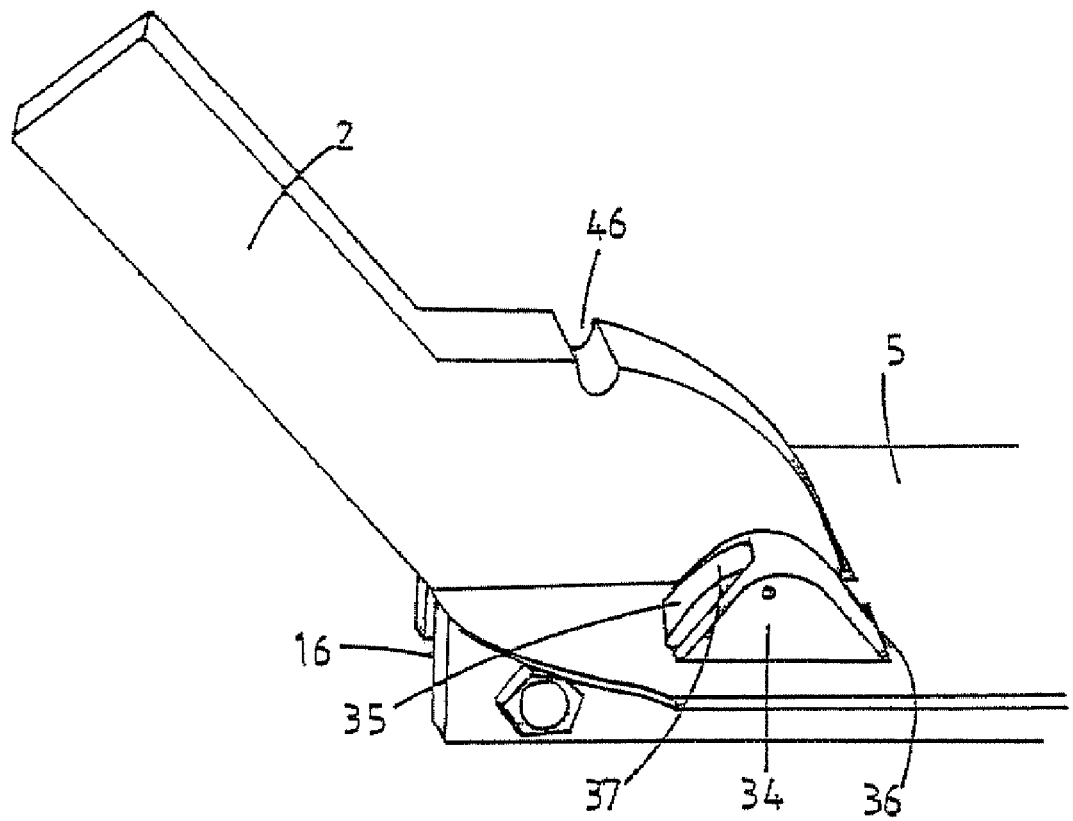
FIG. 7 is a perspective view of a portion of the folding means according to one embodiment of the invention and the locking means shown in FIG. 6.

In one embodiment, as shown in FIG. 7, the locking means comprises a lock release lever in the form of a button (34), which may include a safety lock mechanism (35). The lock release button (34) has a first contact surface where a user pushes down on the button (34) to release the lock. The lock release button (34) also has a second surface having an aperture therein in which a safety lock mechanism (35) can be fitted. Preferably, the lock release button (34) surfaces are shaped to be smooth without protrusions that can catch on clothing.

The locking means also comprises a locking arm (51) that engages with the locking end (4) of the supporting bracket (2) to lock the scooter in an operational position and in a folded position. The locking arm (51) is in operable engagement with the lock release lever (34).

The lock release lever (34) includes an engagement portion for engaging with the locking arm (51). The engagement portion is positioned through a lock receiving opening (36) on one side of the scooter deck (5). The lock receiving opening (36) is positioned adjacent to the opening or slot (16) through which the locking end (4) of the supporting bracket (2) is pivotably mounted.

By positioning the lock release lever (34) at the forward end of the scooter deck (5) and to one side of the deck (5), the lock release lever (34) does not interfere with the operation of the scooter in use. Additionally, the shape and positioning of the lock release lever (34) prevents a user's clothing from becoming entangled with the release lever (34).

It is preferred to use a safety lock mechanism (35) with the lock release lever (34) so that the lock release lever (34) cannot be inadvertently activated by a user accidentally standing on, or otherwise activating, the lock release lever (34) while the user is riding the scooter.

In the embodiment shown in FIG. 7, the lock release lever is in the form of a button (34) and has a substantially hollow interior. The button (34) has an opening to the hollow interior of the button (34) so that the safety lock mechanism (35) can be housed within the lock release button (34) and can project to some extent through the opening.

The safety lock mechanism (35) may take on various forms as will be readily apparent to a person skilled in the art. A safety lock mechanism (35) may also be used with a traditional lever arrangement, rather than the button lever (34) shown in FIG. 7.

In one embodiment according to the invention, and as shown in FIG. 7, the safety lock mechanism (35) is in the form of a lever or button, pivotally attached to the lock release button (34), preferably at or near the upper portion of the lock release button (34). The safety lock (35) has an outer contact surface (37) where a user pushes on the safety lock to disengage the safety lock (35). The inside of the contact surface of the safety lock is the first inner surface.

The safety lock (35) is biased toward a locking position. In this position, part of the safety lock (35) projects from the second surface of the lock release button (34) such that the protruding safety lock (35) projects beyond the adjacent edge of the lock receiving opening (36) in the scooter deck (5). In this position, the projecting safety lock (35) prevents the lock release button (34) from being fully depressed into the lock receiving opening (36) because as the lock release button (34) is depressed, the projecting safety lock (35) abuts the surface of the scooter deck (5), jamming against the deck (5). In this way, the safety lock (35) prevents further downward movement of the lock release lever or button (34) that would otherwise cause the locking means to unlock. Thus, the protruding safety lock (35) prevents inadvertent activation of the lock release mechanism (34).

The safety lock mechanism (35) is biased to a locking position by pressure from a resilient biasing means. Such a biasing means may take the form of a compressed spring housed within the lock release button (34). In this form, one end of the spring presses against the first inner surface of the safety lock (35) (or against an edge or other surface that achieves the same result) and the other end of the spring presses against the opposing inner wall of the lock release button (34). The pressure of the compressed spring against the first inner surface of the safety lock (35) causes the safety lock (35) to be biased toward the locking position.

The safety lock (35) can be depressed to an unlocking position when a user exerts force on the contact surface (37) of the safety lock (35) (the surface of the safety lock (35) that a user contacts when depressing the lock), causing the spring to be further compressed. When the force is removed, the spring or biasing means causes the safety lock (35) to return to its locking position.

To activate the lock release mechanism and unlock the scooter from its locked position, a user depresses the safety lock (35) such that the safety lock (35) substantially retracts into the lock release button (34). The user then depresses the lock release button (34) or lever so that the lock release button (34) is substantially pushed downwardly through the lock receiving opening (36) a sufficient amount to disengage the locking means from the supporting bracket (2), thus unlocking the bracket (2) and scooter deck (5) from the current position and allowing the supporting bracket (2) to pivot relative to the scooter deck (5).

In a preferred form, the contact surface (37) of the safety lock (35) is substantially flush with the second surface of the lock release button (34) at the upper portion of that second surface. Alternatively, the contact surface (37) of the safety lock (35) is not flush with the upper portion of the second surface of the lock release button (34), but is sufficiently close to the second surface of the lock release button (34) so as to fit through the lock receiving opening (36) in the deck without interfering with the edges of the opening. In these arrangements, the contact surface (37) of the safety lock (35) is tapered or sloped toward the upper portion of the second surface of the lock release button (34) and the lower portion of the contact surface (37) of the safety lock (35) projects away from the second surface of the lock release button (34), as shown in FIG. 7.

The lock release button or lever (34) and, hence, the locking means, are also biased to a locking position by a biasing means in engagement with both the lock release button and the scooter deck. By biasing the locking means to a locking position, the scooter is more likely to maintain the operational or folded position, as desired, without inadvertent unlocking from that position. Furthermore, this biasing arrangement helps a user to lock the scooter in the desired position because the locking means will resume its locking position as soon as the user releases pressure from the lock release button.

Once the scooter is in the desired position, the user can remove the pressure exerted by the user on the lock release button (34) or lever. Because the locking means is biased to its locking position, the release of pressure from the lock release button (34) allows the locking means to engage with the supporting bracket (2) once again.

The tapered contact surface (37) of the safety lock (35) helps the lock release button (34) to assume its locked position naturally without the assistance of a user when force is removed from the lock release button (34). In this way, the upper portion of the lock release button (34) retracts through the lock receiving opening (36) without hindrance. As the lock release button (34) retracts through the lock receiving opening (36), the projecting portion of the safety lock (35) contacts the adjacent edge of the opening (36), but the tapered contact surface (37) and the locking bias of the locking means encourages the safety lock (35) to retract into the lock release button (34), thus allowing the lock release button (34) to retract through the opening in the scooter deck (36) and resume its locking position.

The safety lock mechanism is not essential to the operation of the invention but, from a safety perspective, it is particularly important because scooters must remain rigid in use and there must be no risk of accidental folding when the scooter is in motion.

Figure 8:
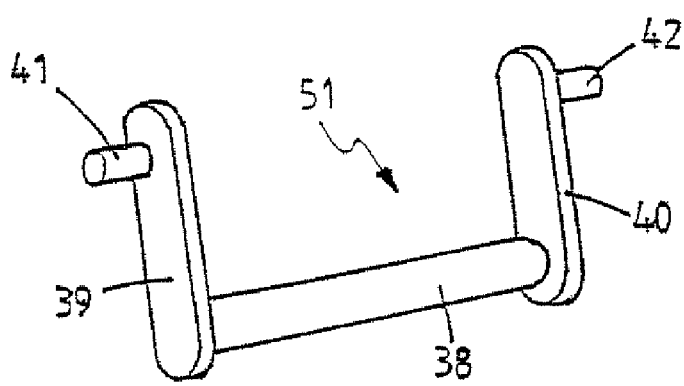
FIG. 8 is a perspective view of a locking arm for the locking means shown in FIGS. 6 and 7.

FIG. 8 shows one embodiment of locking arm prior to assembly on the scooter. The locking arm (51) comprises a locking means in the form of a bar (38) extending between a pair of supporting members (39, 40) that are attached to, or integral with, a first axle (41) and a second axle (42).

Figure 9:
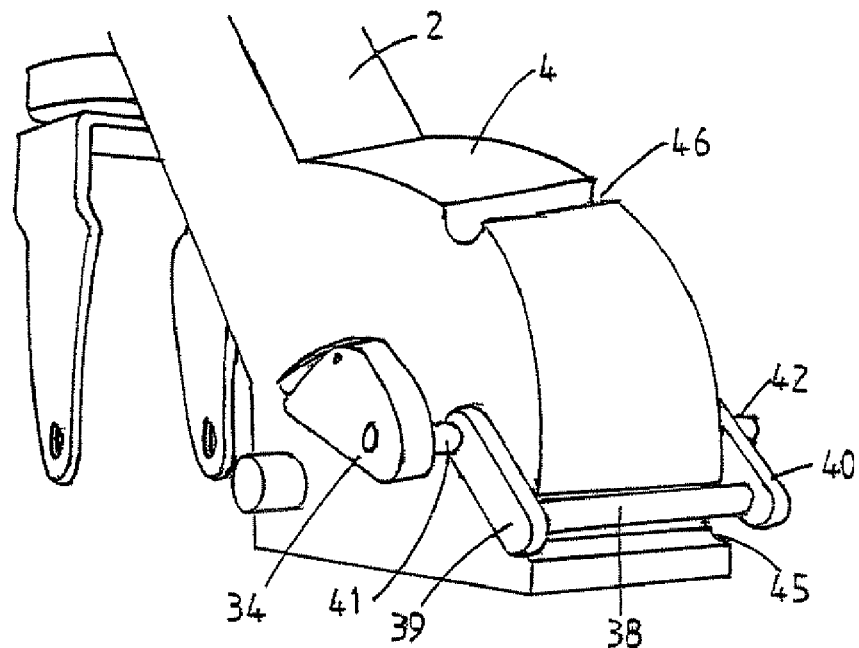
FIG. 9 is a perspective view of the locking means engaged with the folding means of the invention.

Turning now to FIG. 9, the lock release button or lever (34) is hard mounted to the distal end of the first axle (41).

The base (5) of the scooter deck preferably comprises a pair of first and second side walls (11) (as shown in FIG. 7), each having an axle-receiving aperture therein. The first axle (41) of the locking arm extends through an axle-receiving aperture (not shown) in a first side wall (11) and is fixedly attached to, or integral with, a first supporting member (39) in a substantially perpendicular arrangement. Likewise, the second axle (42) extends through a lock axle-receiving aperture in a second side wall and is fixedly attached to, or integral with, a second supporting member (40) in a substantially perpendicular arrangement.

A locking means in the form of a bar (38) is attached to, or integral with, the first and second supporting members (39, 40). In the embodiment shown in FIG. 9, the locking member is an elongate locking bar (38) that is fixedly attached to the first and second supporting members (39, 40) at each end of the locking bar (38).

The locking end of the supporting bracket (2) includes at least a first catch (45) and a second catch (46). Each catch (45, 46) may be in the form of a channel, groove, aperture, recess, or the like. Each catch (45, 46) is adapted to engage with the locking means.

In the embodiment shown in FIG. 9, the locking means is a locking bar (38) shaped and dimensioned to be held within first and second channels (45 and 46 respectively) positioned in the peripheral circumferential surface of the locking end (4) of the supporting bracket (2).

The locking means is biased to the locking position so that when the lock release lever (34) is in the locking position, the locking means is also in a locking position, in which the locking means presses against the locking end of the supporting bracket (2).

When the lock release lever or button (34) is pressed downward into the lock receiving aperture (36) the lock release lever (34) pivots about the longitudinal axis of the first axle (41). Because the lock release lever (34) is fixedly mounted to the first axle (41), the first axle (41) rotates with the pivot action of the lock release lever (34). As the first axle (41) rotates, the first supporting member (39) and the locking means are caused to move away from the locking end (4) of the supporting bracket (2). This movement results in the locking means disengaging from the bracket (2). The user is then able to pivot the bracket (2) and hence the steering column (1) either towards or away from the scooter deck (5) by pivoting the bracket (2) about its pivot point. The user pivots the bracket (2) so that the scooter is in either the folded or operational position, as desired.

The first catch (45) in the locking end (4) is positioned so that it engages with the locking means when the scooter is in the operational position. The second catch (46) in the locking end (4) is positioned so that it engages with the locking means when the scooter is in the folded position. Thus, when a user wants to unfold the scooter and lock the scooter in its operational position, the user depresses the lock release lever (34), causing the locking means to disengage from the second catch (46). The user can then rotate the steering column (1) and release the lock release lever (34) such that the lock release lever (34) and the locking means return to their locking positions, the locking means pressing against the locking end of the supporting bracket (2).

As the user continues to rotate the steering column (1) toward the operational position, the locking means continues to press against the locking end of the bracket (2). Once the steering column (1) is in the operational position, the first catch (45) in the locking end of the bracket (2) will align with the locking means. Because the locking means is pressing against the locking end of the bracket (2), as soon as the locking means aligns with the first catch (45), the locking means presses into the catch (45) and is held in place by the walls of the catch (45) and by the biasing pressure on the locking means. The scooter is now locked in its operational position.

To fold the scooter, the same steps would be taken but the steering column (1) would be moved in the opposite direction.

The locking arm (51) can be made of any suitable material such as metal or a strong polymer.

The locking means may be arranged so that most components below the scooter deck (5) are above or substantially flush with the bottom of the supporting base (10) or side walls (11) of the deck (5). This arrangement means that these parts do not interfere with the operation of the scooter in use, thereby minimising or at least reducing the risk of damaging the locking means in use.

It is also envisaged that the locking arm may simply comprise a first axle attached to, or integral with, a first supporting member, and a locking means in the form of a bar, hook, or extension projecting from the supporting member and adapted to engage with the locking end of the steering column. That is, although it is preferred for the locking arm to comprise a pair of axles, and a pair of supporting members with a locking means extending therebetween, it is envisaged that other forms of locking arm may also be used without departing from the scope of the invention.

Figure 10:
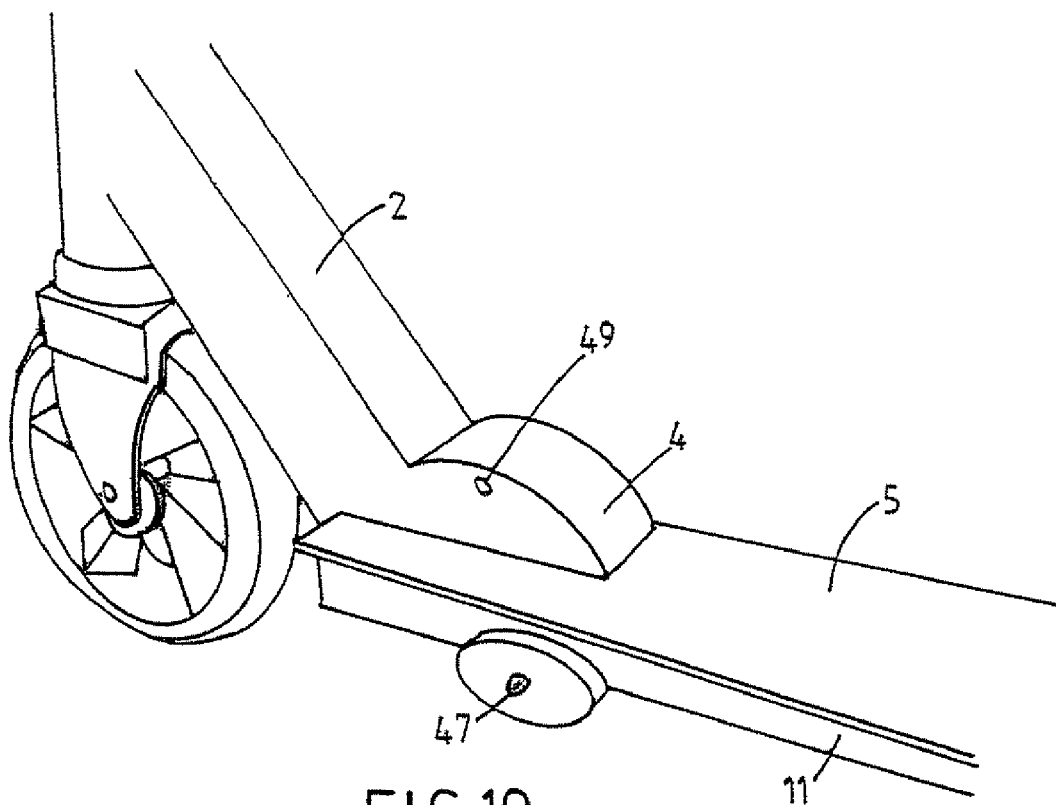
FIG. 10 is a perspective view of a different form of locking means for use with the folding means of the invention.

A scooter having a locking means according to another embodiment of the invention is generally shown at FIG. 10. In this embodiment, the locking means comprises a retractable locking pin for engaging with one or more apertures or recesses in a side of the locking end.

More particularly, the locking end (4) of the support bracket (2) comprises a first and a second catch (49) in the form of an aperture, recess, or detent, in at least one side of the locking end, that side aligning with a first longitudinal side of the scooter deck (5). The first and second catches (49) are each positioned so that they engage with the locking means in the operational and folded positions of the scooter respectively.

The locking means in this embodiment, as shown in FIG. 10, comprises a locking pin (47) that extends through a side wall (11) in the base of the scooter deck (5), the distal end of the locking pin (47) projecting into the first or second catch (49) when the locking means is in the locking position. The locking means can be retracted such that the distal end of the locking pin (47) disengages with the first catch and the locking end of the supporting bracket (2) is then free to pivot relative to the scooter deck (5). Such locking pin arrangements are well known and the application of such arrangements to the foldable apparatus of the present invention would be readily apparent to a person skilled in the art.

In this form of the invention, all component parts of the locking means are below the scooter deck. Therefore, the parts do not interfere with the operation of the scooter in use. This means that the locking means is out if the way of a user's feet and the user's feet are unlikely to accidentally release the lock. This form of locking means is particularly suitable for larger scooters, mobile trolleys and the like.

It is envisaged that the locking means used with a foldable apparatus according to the invention may be adapted to be released by hand. Alternatively, the locking means may be adapted to be released by foot, or by both hand or foot.

Preferred forms of the invention have been described by way of example only and it should be appreciated that modification and additions thereto may be made without departing from the scope of the invention.

For example, it is envisaged that the locking end of the support bracket may comprise only one catch such that the scooter or apparatus is locked in an unfolded position, for example, but not in a folded position. Some other form of lock may be used to hold the scooter in the folded position, if desired. For example, in relation to a scooter, the steering column may have a means of attaching the steering column to the scooter deck when the scooter is in a folded position.

What is claimed is:

1. A folding means for a foldable apparatus, the folding means comprising:
    a first member having a first end and a substantially opposing locking end, the locking end being integral with the first member and comprising opposing side surfaces with a semi-circular convex edge in between, and further comprising at least one aperture, detent, or recess to form at least one catch;
    a second member pivotally connected to the locking end of the first member, the second member comprising a deck having an upper surface in which an opening is formed and
    a locking means located below the upper surface of the deck and being adapted to move relative to the deck to engage with the catch and lock the apparatus in a particular position;
    wherein the locking end of the first member is positioned within the opening such that the opposing side surfaces and semi-circular edge of the locking end are proximate to edges of the opening in the deck to substantially fill the opening regardless of the position of the first member relative to the second member.

2. A folding means according to claim 1, wherein at least one said catch is positioned on the semi-circular edge of the locking end.

3. A folding means according to claim 1, wherein at least one said catch is positioned on at least one side surface of the locking end.

4. A folding means according to claim 1, wherein a pair of said catches are located on the locking end, and one of said pair of catches is positioned so that the locking means can engage with the catch when the apparatus is in a folded position, and the other of said pair of catches is positioned so that the locking means can engage with the catch when the apparatus is in an unfolded position.

5. A folding means according to claim 2, wherein the catch is in the form of a channel.

6. A folding means according to claim 3, wherein the catch is an aperture.

7. A folding means according to claim 3, wherein the catch is a recess.

8. A folding means according to claim 1, wherein the foldable apparatus is a scooter.

9. A folding means according to claim 8, wherein the first member is a supporting bracket for a scooter steering assembly and the second member is a scooter deck.

10. A folding means according to claim 9, wherein the locking means includes lock release means positioned on the deck of the scooter.

11. A folding means according to claim 9, wherein the locking means includes lock release means positioned below the deck of the scooter.

12. A folding means according to claim 11, wherein the locking means is dimensioned such that it does note protrude beyond the width of the scooter deck.

13. A folding means according to claim 1 or 10, wherein the locking means can be released by foot or by hand.

14. A foldable apparatus comprising a folding means according to claim 1.

* * * * *